INVENTOR.
ELMER J. HOELTGE
BY
ATTORNEY.

United States Patent Office 3,463,123
Patented Aug. 26, 1969

3,463,123
ADJUSTABLE RACK AND WASTE REMOVAL
MEANS FOR ANIMAL CAGES
Elmer J. Hoeltge, 1971 Ebenezer Road,
Cincinnati, Ohio 45238
Filed Oct. 3, 1967, Ser. No. 672,499
Int. Cl. A01k 1/00, 31/04
U.S. Cl. 119—15     2 Claims

ABSTRACT OF THE DISCLOSURE

Cages housing animals are stowed in racks consisting of ramps onto which the animal wastes are dropped. The ramps form a part of a cascading flushing system for cleaning the wastes from the ramps. In order to make the flushing system effective, the corners of the racks are supported on caster wheels, which may be adjustably locked at the proper height and which may be braked to provide stability.

Summary of the invention

This invention provides a rack for supporting a plurality of cages for housing small laboratory animals. The rack includes a plurality of ramps above which the cages are supported. A water supply mounted at the top of the rack is periodically discharged onto the ramps which are so arranged that the water cascades downwardly from ramp to ramp until discharged at the bottom of the rack. In order to insure that the water cascades evenly over each ramp to effectively clean away the animal waste material, the rack is provided with an adjustable caster at each corner. The caster permits simple adjustment by means of an open-ended wrench; it can be easily locked; in the event of an overadjustment, it cannot fall out; and it can be braked.

Description of the invention

Figures 1, 2:
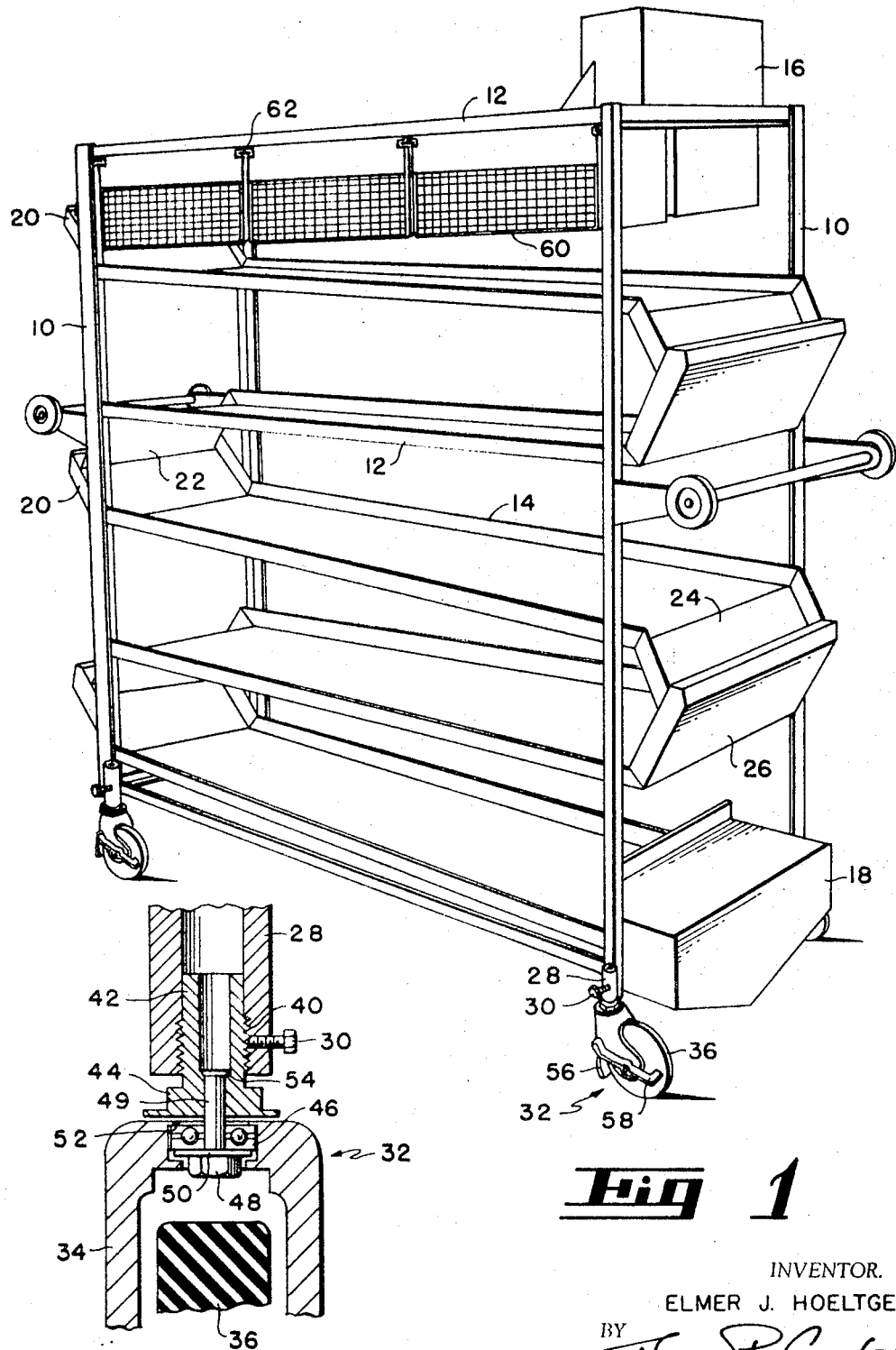
FIGURE 1 is a perspective view of a rack containing a plurality of cages.
FIGURE 2 is a cross section showing a preferred embodiment of the adjustable caster.

The animal rack depicted in FIGURE 1 consists of four vertical corner posts 10 to which a plurality of complementary pairs of ramps 12 and 14 are connected. The ramp 12 and 14 direct the flow of water from a reservoir 16 to a waste receiving tank 18. As noted in the drawing, the ramps 12 are inclined downwardly in one direction (from right to left) while the ramps 14 are inclined in the opposite direction. At one side the ramp 12 has an upwardly directed extension 20 cooperating with the downwardly directed extension 22 of the ramp 14. On the other side the ramp 12 has a downwardly directed extension 24 cooperating with an upwardly directed extension 26 of ramp 14. Therefore, starting from the top ramp the water flows downwardly from right to left (as viewed in the drawings) and back and forth across the various ramps carrying animal waste from the ramps with it to the waste receiving tank 18. Each ramp is, of course, provided with appropriate side walls or flanges for containing the water as it flows.

The bottom of each post 10 is provided with an internaly threaded sleeve 28 which is welded or otherwise appropriately secured thereto. The sleeve 28 is provided with a threaded aperture through which a locking bolt 30 is screwed. A caster 32 is screwed into the sleeve 28 and is locked into position at the appropriate height.

The caster 32 comprises a yoke 34 which rotatably supports a wheel 36 on conventional bearings. The yoke is rotatably mounted from the caster shaft 38. The caster shaft is provided with a threaded portion 40 which is screwed into the internally threaded sleeve 28, a reduced diameter portion 42, and a hexagonal portion 44, which permits adjustment by means of a conventional open-ended wrench of the shaft 38. The shaft 38 is supported on ball bearings 46 sandwiched between a flange 48 at the end of a pin 49, washer 50 at the bottom, and a peened over flange 52 on the yoke 34. The pin 49 is peened over and maintained in fixed relation with respect to an inner flange 54 in the caster shaft 38.

As shown only in FIGURE 1, the caster is provided with a brake 56 pivoted from the yoke (in a conventional manner not shown). The brake has a cam surface which is conventionally driven by a flange on a large wing nut 58.

Cages 60 are slidably supported between the ramps 12 and 14 by means of T flanges 62. The cages are constructed of wire mesh the floors having sufficiently large openings to permit the animal wastes to drop through to the ramps 12 and 14, respectively.

In opeartion, water stored in the reservoir 16 is periodically discharged and it flows over the various ramps cascading downwardy into the tank 18. If the rack has been properly leveled, the water will cascade evenly over each of the ramps. However, any unbalance will cause the water to flow to one side or the other, and therefore be ineffective for flushing purposes.

Since in the normal use of the racks they must be moved from place to place, easy leveling adjustment must be provided. By loosening the lock bolt 30 and applying a common open-ended wrench to the hexagon 44, the height of each caster can independently be raised or lowered so as to level the rack and provide for an even flow across each of the ramps. Once the rack has been leveled for a particular location, the brakes of the casters are set so that further movement of the rack is prevented.

It will be apparent to persons skilled in the art that this invention is susceptible to various adaptations and modifications.

I claim:
1. A rack for storing a plurality of animal cages, said rack including:
   a reservoir mounted on one end at the top thereof for storing a supply of water and a waste receiving tank located at the bottom and at an end thereof for receiving water discharged from said reservoir;
   a plurality of vertically spaced oppositely and alternately inclined ramps supported from said rack, said ramps at one end including water directing means for cascading water discharged from said reservoir from one ramp to the next, said cages being supported above said ramps;
   means for individually adjusting the height of each corner of said rack, said means comprising a caster, said caster having an upstanding shaft, a yoke, a caster wheel rotatably supported from said yoke, said yoke being rotatably supported on the axis of said upstanding shaft, said upstanding shaft having a threaded portion and a reduced diameter non-threaded extension, said extension preventing the accidental removal of said caster;
   an internally threaded sleeve supported from each corner of said rack;
   means for threading the threads of said upstanding shaft into the threads of said sleeve for adjusting the elevation of a respective corner of said rack; and
   locking means extending through said sleeve for locking said caster into position, whereby each of said corners may be individually adjusted to maintain the flow of discharged water evenly across said ramps.

2. The invention as defined in claim 1, and a brake on said caster wheel.

References Cited

UNITED STATES PATENTS

| | | | |
|---|---|---|---|
| 1,564,903 | 12/1925 | Shephard | 119—3 X |
| 2,055,110 | 9/1936 | Raymond | 119—18 X |
| 2,388,157 | 10/1945 | Kerr | 119—31 X |
| 2,701,547 | 2/1955 | Shaw | 119—22 |
| 2,881,733 | 4/1959 | Young et al. | 119—15 |
| 3,109,413 | 11/1963 | Patchett | 119—48 |

ALDRICH F. MEDBERRY, Primary Examiner

U.S. Cl. X.R.

119—22